Oct. 5, 1954   E. B. DREHER   2,690,708
CULTIVATOR WEEDER TRACK FOLLOWER FOR ROW CROPS
Filed April 10, 1951
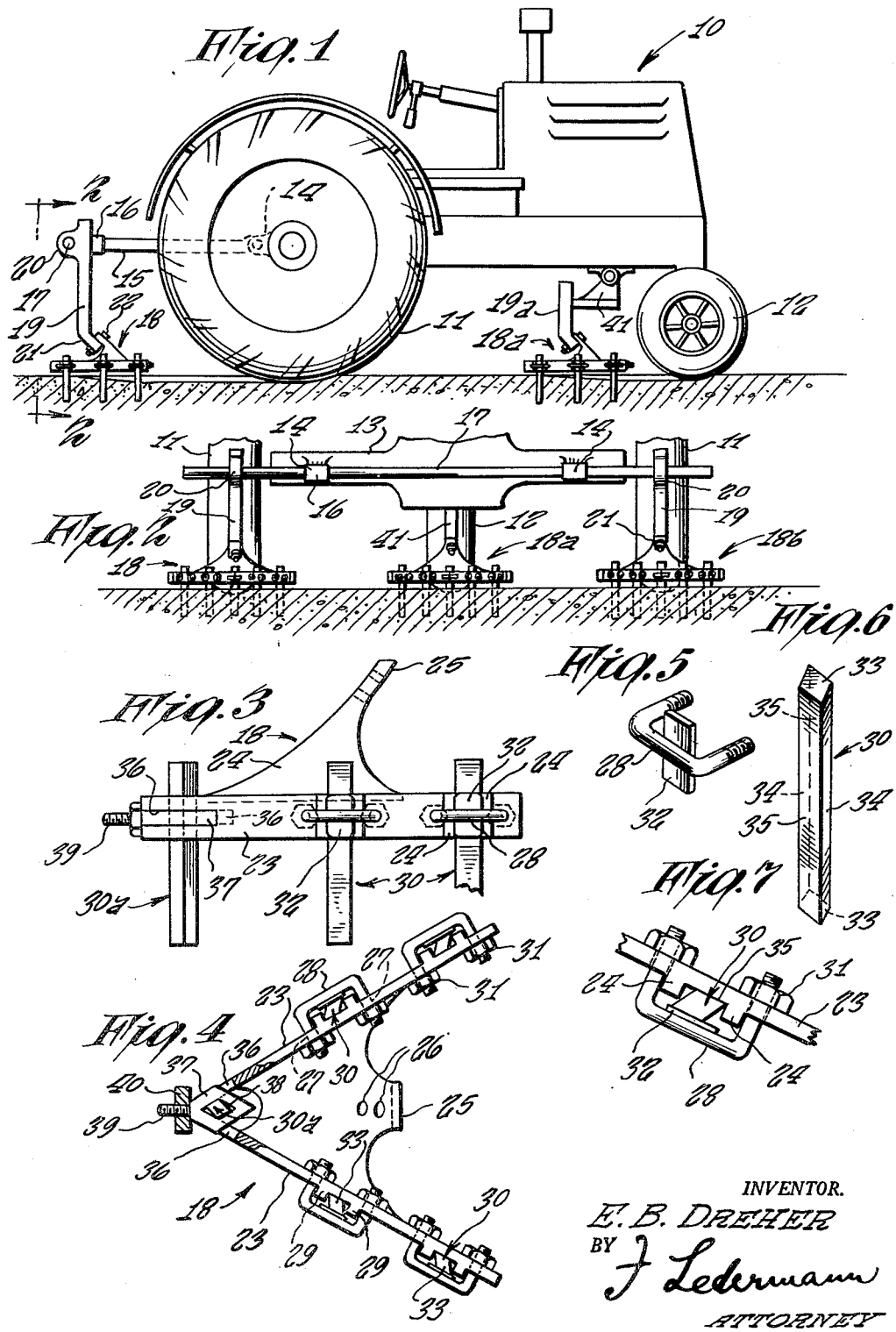
INVENTOR.
E. B. DREHER
BY
J. Ledermann
ATTORNEY Patented Oct. 5, 1954

2,690,708

UNITED STATES PATENT OFFICE 2,690,708

CULTIVATOR WEEDER TRACK FOLLOWER FOR ROW CROPS

Edgar B. Dreher, Longmont, Colo.

Application April 10, 1951, Serial No. 220,249

1 Claim. (Cl. 97—47.44)

1

This invention relates to agricultural machinery, and one object thereof is the provision of a cultivator weeder track follower which functions to break hard pan, to pulverize the soil to keep moisture in it, and to kill small weeds, that is, weeds up to about two inches in height.

Another object of the invention is the provision of track followers attached to a tractor in position to follow in the wheel tracks of the vehicle, the track followers having spaced removable and reversible spikes which dig into the ground and plow the latter as the tractor moves forward.

The above broad as well as additional and more specific objects will be clarified in the following description, wherein characters of reference refer to like-numbered parts in the accompanying drawing. It is to be noted that the drawing is intended solely for the purpose of illustration, and that it is therefore neither desired nor intended to limit the invention necessarily to any or all of the exact details of construction shown except insofar as they may be deemed essential to the invention.

Referring briefly to the drawing, Fig. 1 is a side elevational view of a tractor equipped with the track followers of this invention, showing also the soil under the tractor in section and thus illustrating the penetration of the track follower spikes into the soil.

Fig. 2 is a sectional view taken on the line 2—2 of Fig. 1.

Fig. 3 is a side elevational view of one of the three track followers, per se.

Fig. 4 is a bottom plan view of the track follower shown in Fig. 3, with parts broken away and partly in section.

Fig. 5 is a fragmentary perspective view showing one of the spikes of the track followers and the U-bolt which holds the spike to the frame of the track follower.

Fig. 6 is a perspective view of one of the said spikes, per se.

Fig. 7 is a fragmentary enlargement of Fig. 4.

Referring in detail to the drawing, the numeral 10 indicates a farm tractor having the rear wheels 11 and the front wheel 12. The rear axle housing of the tractor is shown at 13. The tractor followers for the rear wheels, to be described in detail hereinafter, may be secured to the tractor in any suitable manner to insure their functioning properly, and one way of so attaching the rear track followers is illustrated in the accompanying drawing.

The rear axle housing 13 is provided with spaced eyelets or the like 14, in which the forward ends of rearwardly extending rods 15 are pivoted. On their rearward ends the rods 15 carry sleeves or the like 16. A transverse rod or the like 17 is carried in the sleeves 16 and is rigid therewith, the rigidity being attainable in any desired manner, not shown.

For each track follower 18 there is provided a vertical arm 19 having an ear 20 extending rigidly from its upper end in a rearward direction. The arms 19 are secured to the rod 17 by passage of the latter through the ears 20, and the arms 19 are rigid on the rod 17, such rigidity being achieved by making the rod 17 rigid in the ears 20 in any desired manner, not shown. The arms 19 extend downward at substantially right angles to the rod 17 and the ears 20 are so positioned on the rod that the arms 19 will position the track followers 18 in the rear wheel tracks. The lower end of each arm 19 is deformed in a forward direction at an angle of approximately forty-five degrees, the said deformed extremity or extension being indicated at 21, and one or more holes are provided in the extension 21 for the passage therethrough of one or more screw bolts 22.

The track follower 18 comprises an arrowhead-shaped frame including the two upright side members or walls 23 which are joined by an upwardly extending web 24, the latter having at its upper extremity a tongue 25 extending at an angle of approximately forty-five degrees to the horizontal, and being provided with one or more spaced holes 26 also receptive of one or more bolts 22.

The parts 23 and 24 of the track follower 18, just described, may be built in the form of a unitary casting, if desired. Pairs of longitudinally spaced openings 27 are provided through the side members 23 of the track follower 18, receptive of U-bolts 28. Between the holes of each such pair of holes, bosses 29, integral with the members 23, and positioned close to the said holes and preferably rectangular in cross-section, extend outward from the outer surfaces of the members 23. Elongated spikes 30 are adapted to be positioned upright between the bosses 24 and clamped to the member 23 by passing the arms of the U-bolt 28 through the holes 27 and locking the U-bolt by means of nuts 31. Fillers or sheaves 32 may be used as and if desired between the yoke of the U-bolt and the spike.

Each of the spikes 30 is in the form of an elongated parallelopiped having the opposed end surfaces 33, one pair of opposed sides 34, and the other pair of opposed sides 35. The spikes are mounted upright as previously described, with any pair of opposed side surfaces parallel with the member 23 to which they are clamped, although in any arrangement thereof they are all similarly positioned as shown in Fig. 4, or all are positioned reversed, as will be more fully discussed below.

The spike 30a which is positioned in the crotch formed at the junction of the members 23, is identical to the spikes 30 but it is differently mounted in position. Intermediate the height of the members 23, a longitudinal slot 36 is provided through both members extending from a position near the left-hand end (Figs. 3 and 4) through the left-hand extremity of the joined members. A rhomboidal plate 37 having a rhomboidal opening or passage 38 therethrough and having a thickness equal to the vertical width, i. e., the height, of the slots 36, has a threaded stem 39 extending from one end thereof in the plane of the plate and in the line of the longer diagonal thereof. It is apparent that the plate 37 may be inserted into the slots 36 from the left (Figs. 3 and 4) or extracted therefrom. With the plate inserted in the slots 36 as shown in Figs. 3 and 4, the spike 30a is passed through the opening 38 the desired distance, and then, by threading a nut 40 on the stem 39 and tightening the same, the spike 30a will be drawn tight by movement of the plate 37 to the left. Thus the spike 30a is also secured to the track follower.

Assuming that Fig. 7 shows a portion of the lower member 23 of Fig. 4, it is apparent that the spike 30 of Fig. 7 has been turned end for end, that is, through an arc of 180 degrees, with the same side of the spike still contacting the member 23 as in Fig. 4. Assuming that the track follower 18 of Fig. 4 is being drawn to the left, with the spikes digging into the soil, it is apparent that the positioning of the lower end surfaces 33 is such, and likewise the positioning of the left-hand sides 34 is such, as to tend to move the disturbed soil outward away from the vertical plane through the lower member 23, in the manner of a plow spreading the soil outward from the vertical median plane of the plow. The positions of the spikes 30 in Fig. 4 on the lower member 23 is the same as that of the spike 30 in Fig. 6. It is now apparent that if the spikes 30 of the lower member 23 of Fig. 4 are instead positioned like the spike 30 of Fig. 7, they would cut through the soil in a manner to turn the disturbed soil inward instead of outward. Naturally, in every case the spikes 30 would be positioned correspondingly in the upper member 23 of Fig. 4, although the spikes in the two members 23 could of course be positioned oppositely so that one set would turn the soil inward while the other set turned the soil outward. The spike 30a may of course also be reversed in position in the same way.

The track follower 18a for the front wheel track, is similar to the track follower 18 above described, and it includes an arm 19a which may be similar to the arm 19 and which is rigid with a bracket 41 pivoted to the frame of the vehicle.

It is apparent that the depth of penetration of the spikes may be varied at will. The track followers 18 are secured to the arms 19 by passing the screw bolts 22 through the openings 26 in the tongue 25 and through the lower end or extension 21 of the arm 19, and of course the track follower 18a is similarly secured to the arm 19a.

Obviously, modifications in form or structure may be made without departing from the spirit or scope of the invention.

I claim:

A track follower for a vehicle adapted to be drawn behind the vehicle in a wheel track thereof, comprising a horizontal frame having side members positioned at an acute angle to each other and joined at the forward end of the frame to form a crotch, each of said side members having at least one pair of longitudinally spaced holes extending transversely therethrough, said each of said side members having a pair of longitudinally spaced bosses rectangular in cross-section extending from the outer surface of the side member between said holes at right angles to the side member, a spike positioned upright between said bosses and extending downward from said frame, and a U-bolt having the arms thereof passing through said pair of holes and clamping said spike against said side member between said bosses, said spike having the transverse cross-section of a parallelogram and having one side surface thereof positioned parallel and in contact with said outer surface of the side member.

References Cited in the file of this patent

UNITED STATES PATENTS

| Number | Name | Date |
|---|---|---|
| 897,645 | McLean | Sept. 1, 1908 |
| 941,951 | Reynolds | Nov. 30, 1909 |
| 968,976 | Ploen | Aug. 30, 1910 |
| 998,826 | Anderson | July 25, 1911 |
| 1,707,410 | Neusiis | Apr. 2, 1929 |
| 2,156,729 | Krause | May 2, 1939 |